US 8,564,850 B2

(12) United States Patent
Motoyama

(10) Patent No.: US 8,564,850 B2
(45) Date of Patent: Oct. 22, 2013

(54) OPTICAL READING DEVICE, CONTROL METHOD FOR AN OPTICAL READING DEVICE, AND STORAGE MEDIUM

(75) Inventor: Hiroyuki Motoyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 294 days.

(21) Appl. No.: 13/004,833

(22) Filed: Jan. 11, 2011

(65) Prior Publication Data
US 2011/0170151 A1 Jul. 14, 2011

(30) Foreign Application Priority Data
Jan. 13, 2010 (JP) ................. 2010-004571

(51) Int. Cl.
| H04N 1/04 | (2006.01) |
| G06K 15/00 | (2006.01) |
| G06K 9/00 | (2006.01) |
| G06F 3/12 | (2006.01) |
| G03G 15/00 | (2006.01) |
| B65G 43/00 | (2006.01) |
| G03B 27/52 | (2006.01) |

(52) U.S. Cl.
USPC ........ 358/474; 358/1.12; 358/1.13; 358/1.15; 358/498; 358/496; 399/364; 399/365; 399/374; 198/502.2; 355/23; 355/24; 382/137; 382/138; 382/139; 382/140

(58) Field of Classification Search
USPC .............. 358/474, 1.12, 1.13, 1.15, 498, 496, 358/408; 399/365, 374, 364; 198/502.2; 355/23, 24; 382/137, 138, 139, 140; 700/66
See application file for complete search history.

(56) References Cited

U.S. PATENT DOCUMENTS

| 7,548,353 | B2 | 6/2009 | Kakutani |
| 7,808,682 | B2 * | 10/2010 | Tsuchihashi ................. 358/474 |
| 2005/0090912 | A1 * | 4/2005 | Ichikawa et al. ................ 700/66 |
| 2009/0034023 | A1 * | 2/2009 | Tsuchihashi ................. 358/474 |
| 2010/0158592 | A1 * | 6/2010 | Odagiri et al. ................ 399/365 |
| 2010/0230242 | A1 * | 9/2010 | Basu et al. ................ 198/502.2 |
| 2011/0170125 | A1 * | 7/2011 | Asada ......................... 358/1.12 |
| 2011/0170150 | A1 * | 7/2011 | Asada ......................... 358/474 |
| 2012/0019878 | A1 * | 1/2012 | Motoyama ................... 358/474 |
| 2012/0062923 | A1 * | 3/2012 | Nakamaki ................... 358/1.13 |

FOREIGN PATENT DOCUMENTS

| JP | 10-200703 A | 7/1998 |
| JP | 11-041454 A | 2/1999 |
| JP | 2001-197266 A | 7/2001 |
| JP | 2003-244403 A | 8/2003 |
| JP | 2006-020129 A | 1/2006 |

* cited by examiner

Primary Examiner — Charlotte M Baker
Assistant Examiner — Rury Grisham
(74) Attorney, Agent, or Firm — Kilpatrick Townsend & Stockton LLP

(57) ABSTRACT

When optically scanning a medium, scanning can proceed immediately even if the size of the medium is unknown. Before or when an optical reading device starts scanning to read all of a recording medium, the CPU 40 sets a scan block of a size that can always be scanned based on the output of media edge sensors 47 and the distance from the scanning position of the optical reading device to the detection position of the media edge sensors 47, and then scans the set scan block.

15 Claims, 8 Drawing Sheets

OPTICAL READING DEVICE, CONTROL METHOD FOR AN OPTICAL READING DEVICE, AND STORAGE MEDIUM

This application claims priority under 35 U.S.C. §119 to Japanese Patent Application No. 2010-4571 filed on Jan. 13, 2010, the entire disclosure of which is expressly incorporated by reference herein.

BACKGROUND

1. Technical Field

The present invention relates to an optical reading device that conveys a medium to be scanned and optically reads the surface of the medium, to a method of controlling the optical reading device, and to a storage medium.

2. Related Art

Optical reading devices such as scanners that have a stationary optical reading unit for optically reading documents operate according to the size of the medium to be scanned, and therefore run a prescanning process that conveys the document in order to measure the size of the medium before the actual scanning process, are known from the literature. See, for example, Japanese Unexamined Patent Appl. Pub. JP-A-2003-244403.

As described above, the optical reading device according to the related art must prescan a document in order to detect the size of the medium. This means that the document is scanned at least once before the final scan, and must then be returned to its original position to prepare for the actual scan. This requires the operation of returning the medium from the position after the prescan is completed to the starting position of the actual scan, and is time-consuming.

SUMMARY

When optically reading media to be scanned, the invention enables reading quickly even when the size of the medium being scanned is unknown.

A first aspect of the invention is an optical reading device including: a transportation unit that conveys a medium to be scanned; an optical reading unit that is disposed to the transportation path of the medium and optically reads the medium conveyed by the transportation unit; a storage unit that stores a scanned image captured by the optical reading unit; a medium detection unit that detects the medium on the transportation path; a control unit that controls the transportation unit and the optical reading unit; and a storage unit that stores the distance from the scanning position of the optical reading unit to the detection position of the medium detection unit. Before or when the scanning operation of the optical reading unit starts, the control unit sets a scannable range that can be scanned based on the distance from the scanning position of the optical reading unit to the detection position of the medium detection unit stored in the storage unit and detection of the conveyed medium by the medium detection unit, and scans this scannable range.

When scanning all of a document to be scanned without knowing the size of the medium, before (before transportation of the medium by the transportation unit) or when the scanning operation of the optical reading unit starts (when transportation starts), this aspect of the invention first sets a scannable range that can be scanned based on the previously stored distance from the scanning position of the optical reading unit to the detection position of the medium detection unit, and the detection result from the medium detection unit, such as the position of the edge of the conveyed medium inserted to the transportation path, and starts scanning the set scannable range. As a result, scanning can proceed immediately without first conveying the medium in order to measure its size.

In an optical reading device according to another aspect of the invention, the length in the transportation direction of the medium in the scannable range set by the control unit is equal to or shorter than the distance from the scanning position of the optical reading unit to the detection position of the medium detection unit.

For example, if the medium is detected in the distance from the detection position of the medium detection unit to the scanning position of the optical reading unit, a scannable range equal to the distance from the detection position of the medium detection unit to the scanning position of the optical reading unit may be set as the shortest scannable range. If the medium is detected in a distance shorter than the distance from the detection position of the medium detection unit to the scanning position of the optical reading unit, a scannable range equal to the detected length of the medium may be set as the shortest range that can be scanned.

In an optical reading device according to another aspect of the invention, the optical reading device can be connected to an external device, and has a temporary storage unit that stores a scanned image captured by the optical reading unit; and the control unit sends the scanned image of the scannable range stored in the temporary storage unit at least when scanning the scannable range ends.

If scanning at least the scannable range is completed, this aspect of the invention starts sending the scanned image to another device (external device) without waiting to finish scanning the entire document. More specifically, because sending the scanned image of the scannable range for which scanning is completed can start while another scannable range is still being scanned, throughput including the data transfer time can be shortened. The time that is used in the prior art to interrupt scanning and only transmit the scanned image can be shortened. As a result, the time required to scan the full document can be shortened, throughput can be improved, and convenience can be improved. In addition, because the scanned image data stored in volatile temporary memory is sequentially output, the storage capacity of the storage unit can be less than when image data for the entire document is stored. In addition, when scanning plural scannable ranges is completed, the scanned image data can be sent together at one time to the other device.

In an optical reading device according to another aspect of the invention, the control unit sets the next scannable range while scanning or after completing scanning the scannable range based on the distance from the scanning position of the optical reading unit to the detection position of the medium detection unit and the result of detecting the conveyed medium by the medium detection unit.

When scanning one scannable range is completed, this aspect of the invention sets the next scannable range and continues scanning. As a result, the next scannable range can be appropriately set even when the size of the medium being scanned is unknown, and scanning can continue to scan the entire surface. For example, when the medium is detected in the distance from the detection position of the medium detection unit to the scanning position of the optical reading unit, the scannable range is set to the distance from the detection position of the medium detection unit to the scanning position of the optical reading unit. When the medium is detected in a distance that is shorter than the distance from the detection position of the medium detection unit to the scanning position of the optical reading unit, the scannable range is set to the length in which the medium was detected. As a result, the entire surface of a document can be scanned without a separate operation to measure the size of the medium.

In an optical reading device according to another aspect of the invention, the optical reading unit has a temporary storage unit that stores a scanned image captured by the optical reading unit; and after setting the scannable range, the control unit secures storage capacity in the temporary storage unit according to the size of the scannable range.

This aspect of the invention secures the storage capacity required according to the size of the scannable range, and can therefore prevent interrupting scanning due to insufficient storage capacity for smoother scanning. By sending the scanned image data to another device, there is also no need to wait to resolve an insufficient storage problem.

In an optical reading device according to another aspect of the invention, the optical reading unit has a first scanning unit that scans one side of the medium, and a second scanning unit that scans the other side of the medium; and the control unit sets the scannable range to a size common to the first scanning unit and the second scanning unit based on the medium detection status of the medium detection unit, and the distance from the scanning position of the first scanning unit or second scanning unit to the detection position of the medium detection unit.

This aspect of the invention sets a scannable range of a size common to both the first scanning unit and second scanning unit when scanning both sides of a medium. As a result, when the scanning positions of the first and second scanning units are the same and when they are offset from each other, both sides can be scanned at substantially the same time, and processing time can be further shortened.

In an optical reading device according to another aspect of the invention, when the medium detection unit detects the end of the medium while the scannable range is being scanned, the control unit sets the end of the scannable range being scanned to the detected end of the medium.

This aspect of the invention enables scanning continuously to the bottom end (trailing end) of the medium without a separate operation for measuring the size of the medium. In addition, scanned image data for the range to the end of the medium that is shorter than the distance from the detection position of the medium detection unit to the scanning position of the optical reading unit can be transmitted to another device together with the image data for the range being scanned, and throughput can be improved.

Another aspect of the invention is a method of controlling an optical reading device that has a control unit, a transportation unit that conveys a medium to be scanned, an optical reading unit that is disposed to the transportation path of the medium and optically reads the medium conveyed by the transportation unit, and a medium detection unit that detects the medium on the transportation path at a position separated from the scanning position of the optical reading unit. When the size of the medium is unknown or when scanning all of the medium by the optical reading unit, the control method sets, before or when the scanning operation of the optical reading unit starts, a scannable range that can be scanned based on the distance from the scanning position of the optical reading unit to the detection position of the medium detection unit stored in the storage unit and detection of the conveyed medium by the medium detection unit; and then scans this scannable range.

When scanning all of a document to be scanned without knowing the size of the medium, before (before transportation of the medium by the transportation unit) or when the scanning operation of the optical reading unit starts (when transportation starts), this aspect of the invention first sets a scannable range that can be scanned based on the distance from the scanning position of the optical reading unit to the detection position of the medium detection unit, and the detection result from the medium detection unit, such as the position of the edge of the conveyed medium, and starts scanning the set scannable range. As a result, scanning can proceed immediately without first conveying the medium in order to measure its size.

For example, if the medium is detected in the distance from the detection position of the medium detection unit to the scanning position of the optical reading unit, a scannable range equal to the distance from the detection position of the medium detection unit to the scanning position of the optical reading unit may be set as the shortest scannable range. If the medium is detected in a distance shorter than the distance from the detection position of the medium detection unit to the scanning position of the optical reading unit, a scannable range equal to the detected length of the medium may be set as the shortest range that can be scanned.

Another aspect of the invention is a recording medium storing a program that can be executed in an optical reading device having a control unit by the control unit, wherein the optical reading device has a transportation unit that conveys a medium to be scanned, an optical reading unit that is disposed to the transportation path of the medium and optically reads the medium conveyed by the transportation unit, a medium detection unit that detects the medium on the transportation path at a position on the transportation path separated from the scanning position of the optical reading unit, and a storage unit that stores the distance from the scanning position of the optical reading unit to the detection position of the medium detection unit. The program has as steps executed by the control unit when scanning all of a document to be scanned without knowing the size of the medium steps of: setting, before or when the scanning operation of the optical reading unit starts, a scannable range that can be scanned based on the distance from the scanning position of the optical reading unit to the detection position of the medium detection unit stored in the storage unit and detection state of the medium detection unit; and scanning this scannable range.

By executing this program when scanning all of a document to be scanned without knowing the size of the medium, before (before transportation of the medium by the transportation unit) or when the scanning operation of the optical reading unit starts (when transportation starts), the control unit first sets a scannable range that can be scanned based on the distance from the scanning position of the optical reading unit to the detection position of the medium detection unit, and the detection result from the medium detection unit, such as the position of the edge of the conveyed medium, and then starts scanning the set scannable range. As a result, scanning can proceed immediately without first conveying the medium in order to measure its size.

For example, if the medium is detected in the distance from the detection position of the medium detection unit to the scanning position of the optical reading unit, a scannable range equal to the distance from the detection position of the medium detection unit to the scanning position of the optical reading unit may be set as the shortest scannable range. If the medium is detected in a distance shorter than the distance from the detection position of the medium detection unit to the scanning position of the optical reading unit, a scannable range equal to the detected length of the medium may be set as the shortest range that can be scanned.

Effect of at Least One of Embodiment of the Invention

At least one of embodiment of the invention enables immediately scanning a document when the size of the medium is unknown without a separate operation to measure the size of the medium.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures.

Figure 1:
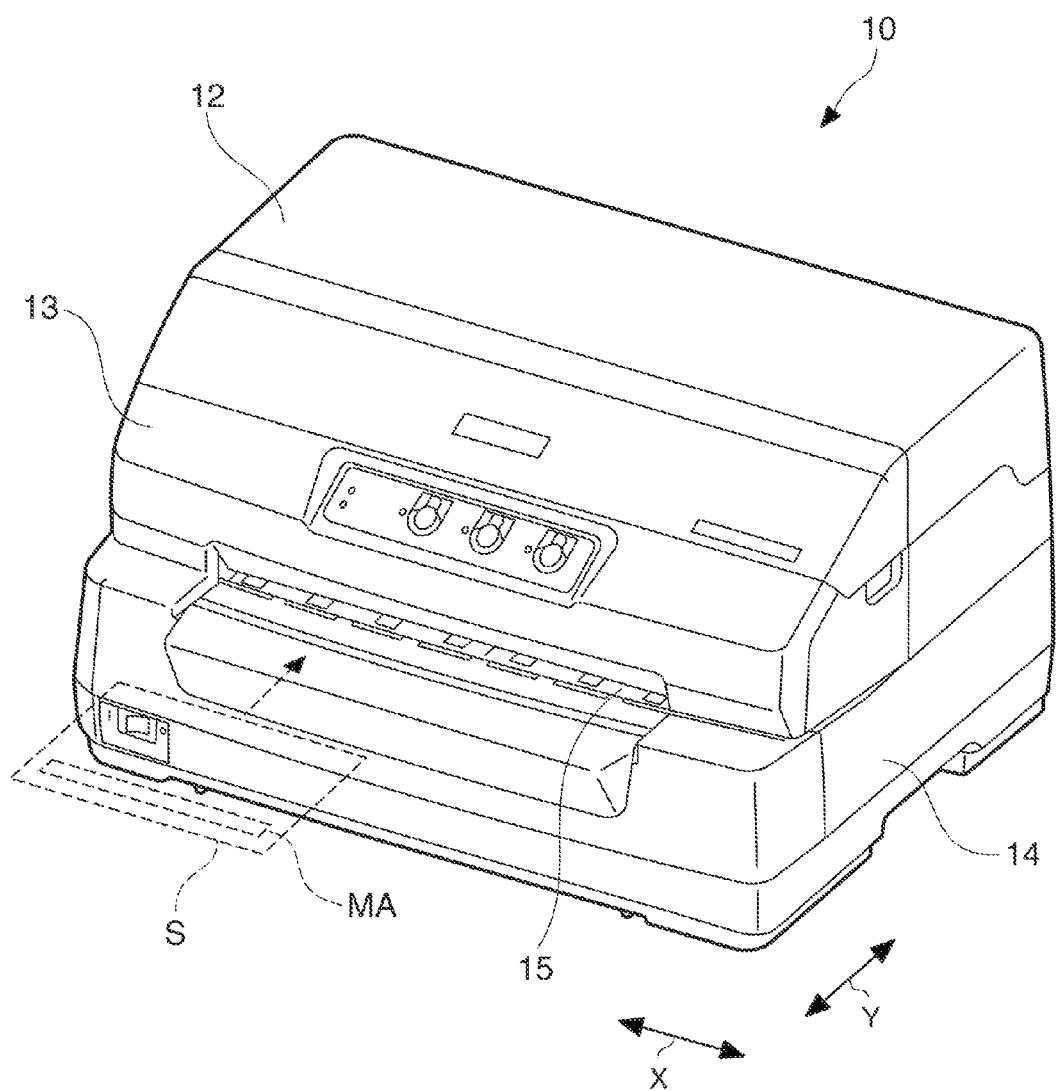
FIG. 1 is an external oblique view of a dot impact printer according to a preferred embodiment of the invention.
Figure 2:
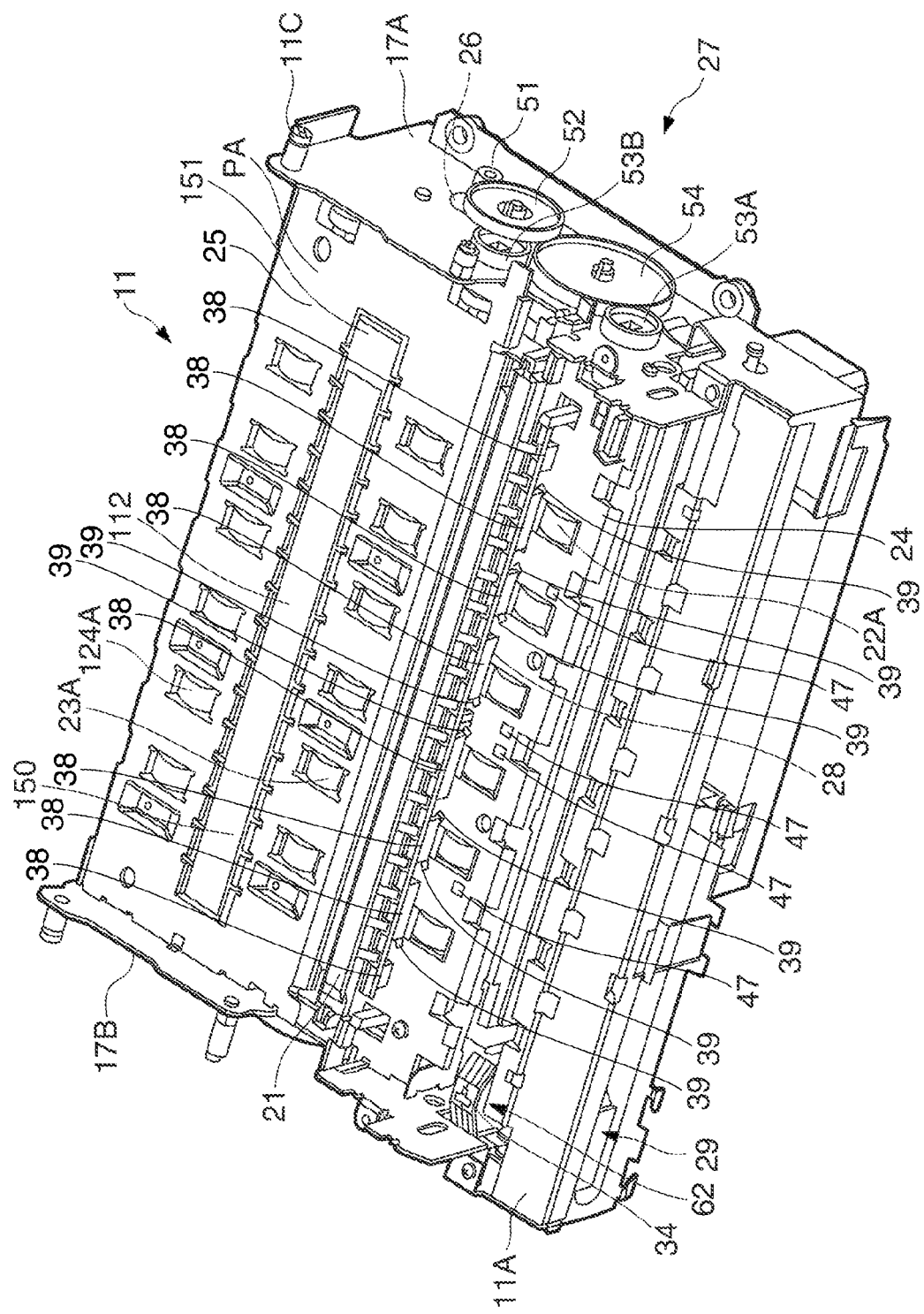
FIG. 2 is an oblique view of the print assembly.
Figure 3:
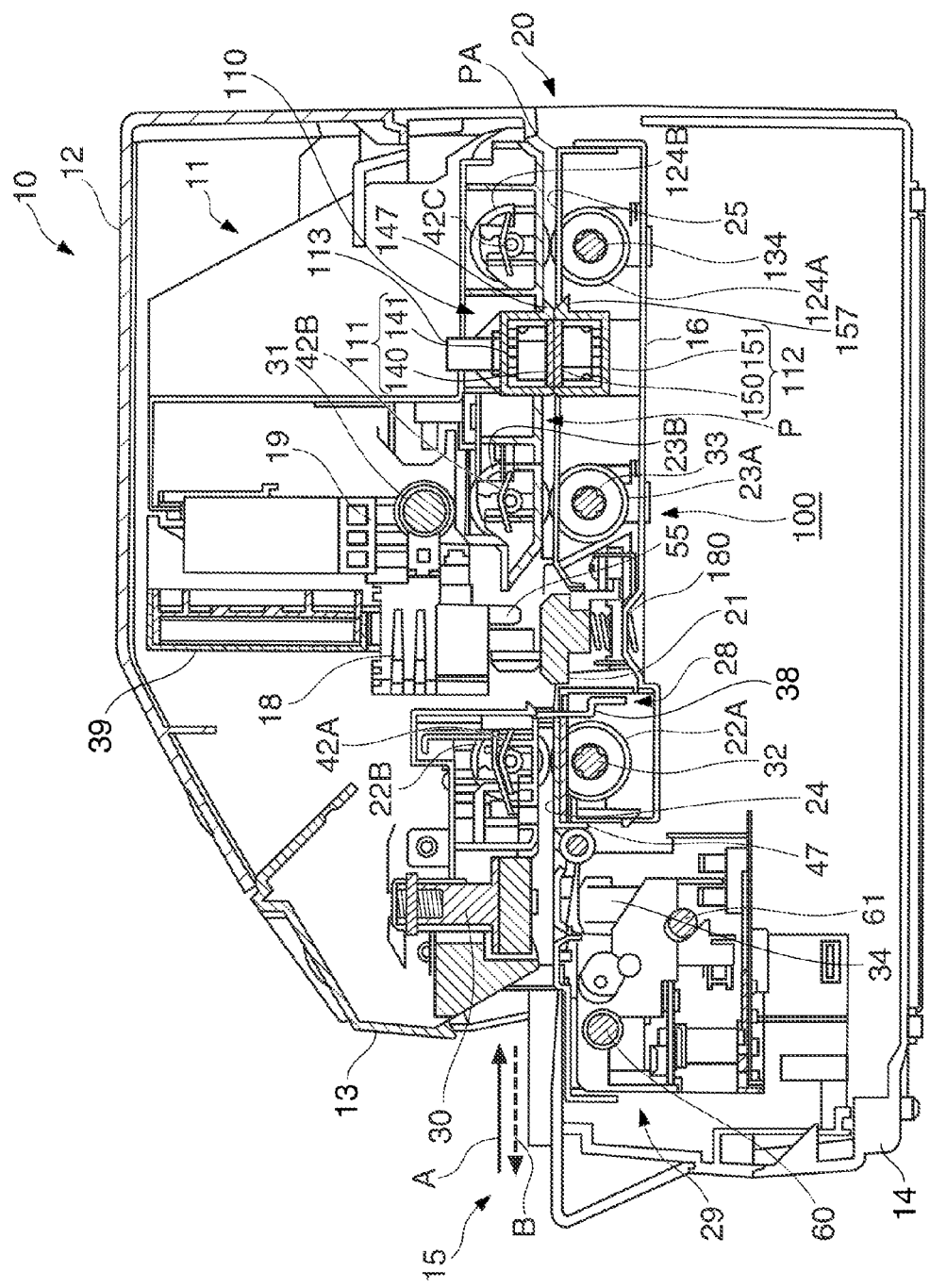
FIG. 3 is a side section view of the print assembly.

FIG. 1 is a front oblique view showing the appearance of a dot impact printer according to a preferred embodiment of the invention. FIG. 2 is an oblique view of the print assembly 11. FIG. 3 is a side section view of the dot impact printer 10 in FIG. 1.

The dot impact printer 10 shown in FIG. 1 records images, including text, by driving plural recording wires of a recording head 18 (see FIG. 3) against a recording medium S with an ink ribbon (not shown in the figure) delivered from a ribbon cartridge (not shown in the figure) therebetween in order to form dots on the recording surface of the recording medium S. The dot impact printer 10 has an optical reader (scanner) 110 (FIG. 3) and thus also functions as an optical reading device that can optically read text, symbols, images, and other content presented on the surface of the recording medium S.

Cut-sheet media that is precut to a certain length, and continuous media having numerous sheets connected in a continuous web, are examples of recording media S (media) that can be used in the dot impact printer 10. Cut-sheet media include, for example, single slips and multipart forms, passbooks, postcards, and letters. Continuous media include continuous multipart form paper and perforated fanfold paper. In this embodiment of the invention checks and promissory notes (collectively referred to as simply checks herein) issued on a bank account, for example, and passbooks issued by a bank or other financial institution, are used as the recording medium S.

Checks are slips on which MICR (magnetic ink character recognition) information containing the user's account number and a serial check number, for example, are printed in a MICR area MA on the check surface. A passbook is a bound booklet of plural blank pages that can be printed on when the passbook is open. A magnetic stripe is typically rendered on the outside surface of one of the passbook covers.

Note that of the four sides of a rectangular recording medium S, the edge on the side that is inserted to the dot impact printer 10 is referred to herein as the leading edge or end, and the edge on the opposite side as the leading end is referred to as the trailing edge or end.

As shown in FIG. 1, the dot impact printer 10 has a top cover 12, a top case 13, and a bottom case 14 as outside case members, and a manual insertion opening 15 in the front of the top case 13 and bottom case 14 where the recording medium S is inserted and discharged. A paper exit 20 from which the recording medium S may be discharged is also formed at the back of the top case 13 and bottom case 14. Whether the recording medium S processed by the dot impact printer 10 is discharged from the manual insertion opening 15 or the paper exit 20 is controlled by a command sent to the dot impact printer 10 from the host computer 200 described below.

The side where the manual insertion opening 15 is rendered, that is, the left side as seen in FIG. 3, is referred to herein as the front, and the side where the paper exit 20 is rendered, that is, the right side in FIG. 3, is referred as the rear or back.

As shown in FIG. 2, the dot impact printer 10 has a print assembly 11 that is covered by the foregoing case members. The print assembly 11 includes a bottom chassis part 11A and a top chassis part (not shown in the figure) that is supported by pins 11C at the back of the bottom chassis part 11A. The top chassis part can pivot by operating a lever (not shown in the figure) disposed on the left side of the top chassis part, and the inside of the print assembly 11 is exposed when the top chassis part pivots open.

As shown in FIG. 2 and FIG. 3, the print assembly 11 includes a base frame 16 and a right side frame 17A and left side frame 17B pair attached to the sides of the base frame 16. The side frames (not shown in the figure) of the top case chassis part are disposed on the outside of the side frames 17A and 17B with a carriage guide shaft 31 spanning therebetween and a flat front media guide 24 and rear media guide 25 affixed between the side frames 17A and 17B. A flat platen 21 is disposed between the front media guide 24 and rear media guide 25, and the recording head 18 is disposed above the platen 21 facing the platen 21.

The recording head 18 is mounted on a carriage 19 that is fit freely slidably on the carriage guide shaft 31. The carriage 19 is driven through an intervening timing belt (not shown in the figure) by the forward or reverse rotation of a carriage drive motor 56 (FIG. 4) that drives the carriage 19, and the carriage 19 thus moves reciprocally guided by the carriage guide shaft 31. The carriage 19 scans bidirectionally between the side frames of the top chassis part in the direction indicated by arrow X in FIG. 1, that is, in the main scanning direction aligned with the axial direction of the carriage guide shaft 31 and the long side of the platen 21. Note that the direction perpendicular to the main scanning direction X of the carriage 19, that is, the direction indicated by arrow Y in FIG. 1, is the subscanning direction.

While the recording head 18 carried on the carriage 19 travels in the main scanning direction with the carriage 19, recording wires are pushed out from the wire face (not shown in the figure) on the distal end of the recording head 18 opposite the platen 21 to strike the ink ribbon and transfer ink from the ink ribbon to the recording medium S conveyed between the platen 21 and the recording head 18, and record an image, which may include text, on the recording medium S. The ink ribbon is stored folded up inside a ribbon cartridge (not shown in the figure) that is mounted on the main frame or the carriage 19, and is delivered to the recording head 18 while the carriage 19 scans the recording medium. As shown in FIG. 3, a media width sensor 55 is disposed behind the recording head 18 at a position above the platen 21. The media width sensor 55 is mounted on the carriage 19 and travels with the carriage 19 over the platen 21, and is used to determine the positions of the side edges of the recording medium S and the width of the recording medium S.

As shown in FIG. 2 and FIG. 3, the platen 21 is flat and extends in the scanning direction of the carriage 19, and is urged toward the recording head 18 and elastically supported by an urging spring 180. The urging spring 180 is a compression spring, and the striking force of the recording wires during the recording operation of the recording head 18 is assisted by the urging force of the urging spring 180. When the thickness of the recording medium S varies while the recording medium S is conveyed, or when recording media S of different thicknesses are conveyed to the print assembly 11, the platen 21 is pushed by the distal end of the recording head 18 in resistance to the urging force of the urging spring 180 and moves away from the recording head 18. As a result, the gap between the distal end of the recording head 18 and the recording surface of the recording medium S is held constant regardless of the thickness of the recording medium.

As shown in FIG. 3, the printer assembly 11 includes a media transportation mechanism 100 that conveys the recording medium S, an alignment mechanism 28 that contacts the leading end of the recording medium S conveyed by the media transportation mechanism 100 and aligns the recording medium S, a magnetic data reading unit 29 having a magnetic head 34 that reads the MICR information printed on a check or reads or writes magnetic information in the magnetic stripe on a passbook, and a media pressure unit 30 that pushes down on the recording medium S to prevent the recording medium S from lifting up during magnetic information processing, including when the magnetic head 34 of the magnetic data reading unit 29 reads the MICR information.

As shown in FIG. 2 and FIG. 3, the media transportation mechanism 100 includes the platen 21, a first drive roller 22A, a first follower roller 22B, a second drive roller 23A, a second follower roller 23B, a third drive roller 124A, a third follower roller 124B, the front media guide 24, the rear media guide 25, a media transportation motor 26, and a drive wheel train 27. The media transportation mechanism 100 renders a transportation path P through which the recording medium S is conveyed over the front media guide 24 and rear media guide 25. The tops of the front media guide 24 and rear media guide 25 are conveyance surface PA of the transportation path P.

In this embodiment of the invention the first drive roller 22A and first follower roller 22B are disposed on the front side of the printer assembly 11 relative to the platen 21 and recording head 18, and the second drive roller 23A and second follower roller 23B pair, and third drive roller 124A and third follower roller 124B pair, are disposed sequentially on the rear side of the printer assembly 11 relative to the platen 21 and recording head 18.

The first drive roller 22A and first follower roller 22B are disposed as a roller pair one above the other, the second drive roller 23A and second follower roller 23B are disposed as a roller pair one above the other, and the third drive roller 124A and third follower roller 124B are disposed as a roller pair one above the other.

The first drive roller 22A, second drive roller 23A, and third drive roller 124A are drive rollers that are driven rotationally by the media transportation motor 26 and drive wheel train 27. The first follower roller 22B, second follower roller 23B, and third follower roller 124B are follower rollers that are urged by springs 42A, 42B, and 42C with specific pressure to the first drive roller 22A, second drive roller 23A, and third drive roller 124A side, respectively. As a result, the first drive roller 22A and first follower roller 22B are rotationally driven in mutually opposite directions, the second drive roller 23A and second follower roller 23B are rotationally driven in mutually opposite directions, and the third drive roller 124A and third follower roller 124B are rotationally driven in mutually opposite directions.

The drive wheel train 27 is disposed on the outside of the right side frame 17A as shown in FIG. 2. The drive wheel train 27 has a motor pinion 51 that is affixed to rotate in unison with the drive shaft of the media transportation motor 26, which can rotate in forward and reverse directions. Drive power from the motor pinion 51 is transferred through a speed reducing gear 52 to a second drive gear 53B affixed to the second roller shaft 33 of the second drive roller 23A, and is transferred from this second drive gear 53B through an intermediate gear 54 to a first drive gear 53A affixed to the first roller shaft 32 of the first drive roller 22A.

Torque from the second roller shaft 33 of the second drive roller 23A is transferred to the third roller shaft 134 of the third drive roller 124A by a drive belt (not shown in the figure), for example. As a result, the first drive roller 22A, second drive roller 23A, and third drive roller 124A shown in FIG. 3 rotate in the same direction and can convey the recording medium S in the printer assembly 11. More specifically, when the media transportation motor 26 rotates forward, the first drive roller 22A, second drive roller 23A, and third drive roller 124A shown in FIG. 3 convey the recording medium S in the sub-scanning direction inside the printer assembly 11 as denoted by arrow A in the figure, and convey the recording medium S in the direction in which it is discharged from the printer assembly 11 as indicated by arrow B in the figure when the media transportation motor 26 turns in reverse.

The alignment mechanism 28 aligns the recording medium S before the recording head 18 prints on the recording medium S and before the optical reader 110 scans the recording medium S. The alignment mechanism 28 includes plural alignment plates 38 and an alignment plate motor (see FIG. 4) that drives the alignment plates 38. The alignment plates 38 are arrayed in the main scanning direction between the first drive roller 22A and first follower roller 22B and the recording head 18 and platen 21, and can protrude into the transportation path P. The alignment mechanism 28 aligns the orientation of the recording medium S by causing the leading end of the recording medium S to contact the alignment plates 38.

As shown in FIG. 2, the printer assembly 11 has a plurality of alignment sensors 39 that detect the presence of the recording medium S driven in contact with the alignment plates 38. The alignment sensors 39 are disposed to the transportation path P arrayed in the main scanning direction near the upstream side of the alignment plates 38, and are transmissive sensors including a light-emitting unit (such as an LED) and a photodetection unit (such as a phototransistor) disposed with the transportation path P therebetween. Whether the skew of the recording medium S to the transportation direction after alignment by the alignment mechanism 28 is within the allowable range can be determined from the number and positions of the plural alignment sensors 39 that detect the leading end of the recording medium S.

The dot impact printer 10 has a control circuit board (not shown in the figure) located behind and below the print assembly 11, for example, as a control unit that controls dot impact printer 10 operations, including driving the media transportation motor 26, carriage 19 scanning, the recording operation of the recording wires of the recording head 18, and the reading (scanning) operation of the optical reader 110.

The printer assembly 11 also has a plurality of media edge sensors 47 that detect insertion of a recording medium S to the transportation path P in front of the first drive roller 22A. The media edge sensors 47 are reflective sensors having a light-emitting unit that emits light toward the transportation path P and a photodetection unit that detects the reflection of the emitted light, and detect the recording medium S inserted from the manual insertion opening 15. Note that the media edge sensors 47 may alternatively be transmissive sensors having a light-emitting unit and a photodetection unit disposed with the transportation path P therebetween. This configuration determines that a recording medium S was inserted to the transportation path P when the photodetection units of all insertion detection sensors 47 sense light and then photodetection by any one of the insertion detection sensors 47 is blocked.

As shown in FIG. 3, the print assembly 11 has an optical reader 110 (optical reading unit) that reads text, symbols and images presented on the surface of the recording medium S. The optical reader 110 includes a first scanner 111 (first scanning unit) that reads information printed or otherwise presented on the top surface of the recording medium S, and a second scanner 112 (second scanning unit) disposed opposite the first scanner 111 that similarly reads information printed or otherwise presented on the bottom surface of the recording medium S. The recording medium S is normally inserted from the manual insertion opening 15 so that the side on which the MICR information is printed is on the bottom.

The first scanner 111 and second scanner 112 are optical image sensors that are disposed between the second drive roller 23A and third drive roller 124A and continuously read information on the recording medium S conveyed through the transportation path P.

The first scanner 111 and second scanner 112 may be contact image sensors (CIS), for example, and respectively have a flat glass plate 140, 150 that contacts the recording medium S, and a support frame 141, 151 that supports the glass plate 140, 150. An emitter (not shown in the figure) that illuminates the scanning area of the recording medium S with light output from an LED or other light source, a plurality of photosensors (not shown in the figure) arrayed in a single row in the main scanning direction (X axis), and an output unit (not shown in the figure) that outputs the signals from the photosensors to the control circuit unit described above, are housed inside the support frames 141, 151. The first scanner 111 and second scanner 112 are not limited to CIS scanners, however, and CCD (charge coupled device) scanners may be used instead.

As shown in FIG. 2, the second scanner 112 has a support frame 151 and glass plate 150 extending lengthwise across the width of the dot impact printer 10 parallel to the platen 21. The support frame 151 is disposed so that the top surface of the glass plate 150 is exposed to the transportation path P through a window formed in the rear media guide 25. The first scanner 111 is disposed above the second scanner 112 as shown in FIG. 3 so that the bottom surface of the glass plate 140 is opposite the top of glass plate 150, and likewise extends in the main scanning direction with substantially the same length as the second scanner 112.

An urging member 113 is disposed above the first scanner 111, and the first scanner 111 is urged toward the recording medium S on the rear media guide 25 by the urging member 113. The urging member 113 pushes the first scanner 111 to the second scanner 112 with substantially uniform pressure across the width. A coil spring, flat spring, or elastomer cushion, for example, can be used as the urging member 113. A gap that accommodates recording media of a specific thickness is rendered between the surfaces of the glass plates 140, 150. When scanning a recording medium S, the first scanner 111 is pushed up by the conveyed recording medium S and the urging member 113 contracts, allowing the recording medium S to pass between the glass plates 140, 150. More specifically, the scanning quality of the optical reader 110 is improved by the first scanner 111 that is urged by the urging member 113 pushing the recording medium S to the second scanner 112 side so that the recording medium S reliably contacts the surfaces of the glass plates 140, 150.

The photosensors (not shown in the figure) of the first scanner 111 and second scanner 112 are arrayed in a row in the main scanning direction of the dot impact printer 10, and scan lines extending in the main scanning direction. The photosensors of the first scanner 111 and second scanner 112 are disposed across a wider range in the main scanning direction than the printing range of the recording head 18, and can scan a wider range than any recording medium that can be printed on by the dot impact printer 10. The optical reader 110 can therefore read the entire surface of any recording medium S that can be used in the dot impact printer 10.

The first scanner 111 and second scanner 112 are disposed on opposite sides of the transportation path P as shown in FIG. 3 with the photosensor array of the first scanner 111 and the photosensor array of the second scanner 112 offset approximately 5 mm from each other in the transportation direction of the recording medium S. This configuration prevents the light from one light source from affecting the photosensors of the other scanner, and therefore enables achieving higher quality scans.

The first scanner 111 and second scanner 112 each have R, G, and B light sources, and can scan in both monochrome (binary, 16 level, 256 level gray scale) and color modes. The scanning resolution of the first scanner 111 and second scanner 112 can be set to one of three levels, 200 dpi (dots/inch), 300 dpi, and 600 dpi. The number of scan lines in the transportation direction of the recording medium S (the subscanning direction) is set according to the scanning resolution in the main scanning direction, and the conveyance speed of the recording medium S during scanning is adjusted according such parameters as the scanning resolution and how fast the photosensor output signals can be processed.

Figure 4:
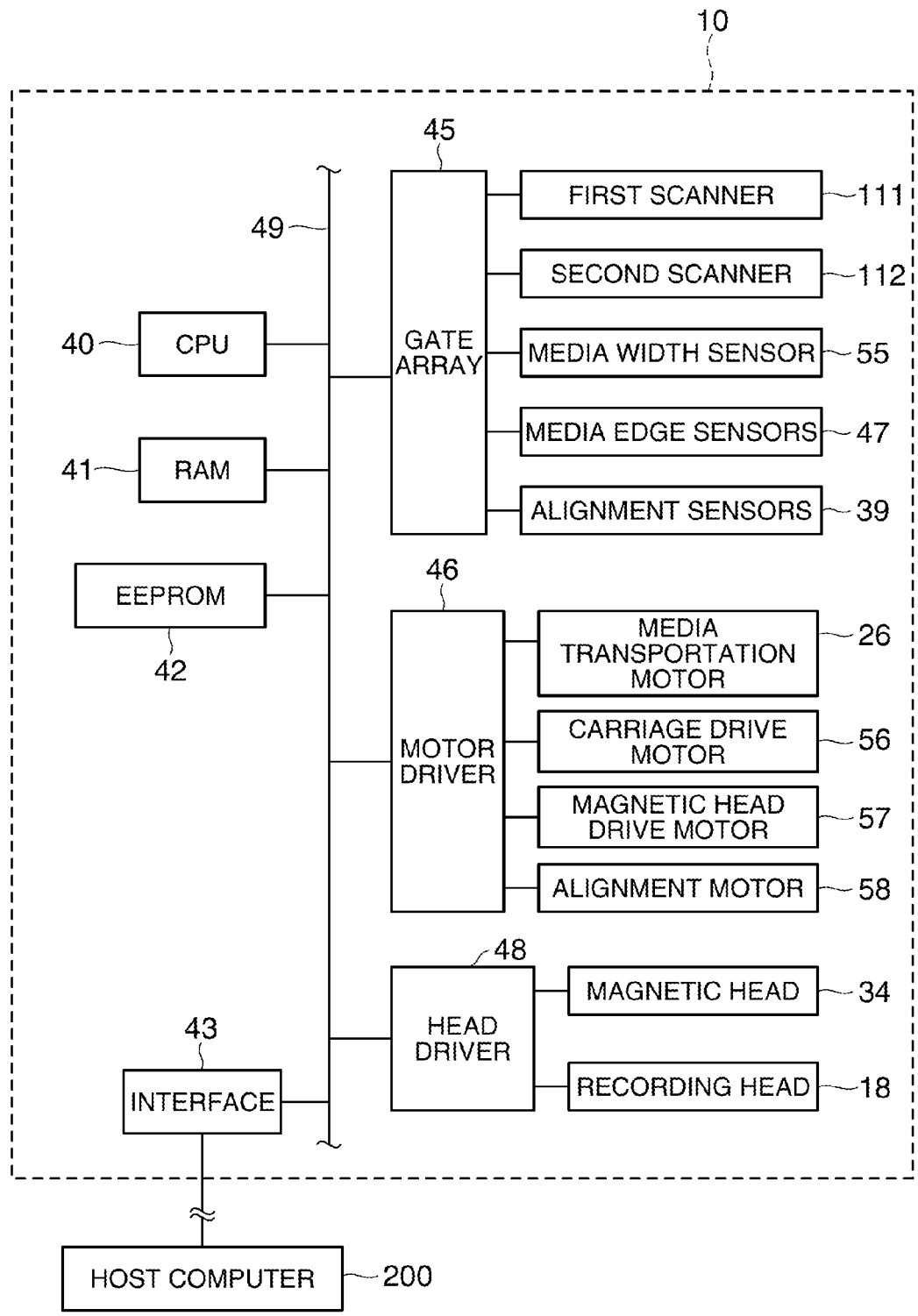
FIG. 4 is a block diagram showing the functional configuration of the dot impact printer.

FIG. 4 is a block diagram showing the control configuration of the dot impact printer 10.

The parts shown in FIG. 4 can be rendered by the cooperation of hardware components disposed to the control circuit board (not shown in the figure) and software.

The dot impact printer 10 includes a CPU 40 as a control unit that controls the dot impact printer 10 based on a control program, RAM 41 that temporarily stores data and a control program read from EEPROM 42, which is nonvolatile memory, by the CPU 40, EEPROM 42 that stores the control program executed by the CPU 40 and processed data, an interface 43 that converts the data format when communicating information with the host computer 200 that controls the dot impact printer 10, a gate array 45 connected to various sensors, a motor driver 46 that drives motors, a head driver 48 that drives heads, and a bus 49 to which these various parts are connected.

RAM 41 functions as a storage unit, and renders an image buffer (not shown in the figure) that temporarily stores the image data captured by the optical reader 110.

The alignment sensors 39, media edge sensors 47, media width sensor 55, first scanner 111 and second scanner 112 are connected to the gate array 45. The gate array 45 quantizes the analog voltages input from the alignment sensors 39, media edge sensors 47, and media width sensor 55, and outputs the resulting digital data to the CPU 40. The first scanner 111 and second scanner 112 optically read the surface of the recording medium S using a CIS, supply the detection voltages from each pixel of the CIS to the gate array 45, and the gate array 45 quantizes the analog voltages supplied from the first scanner 111 and second scanner 112 and outputs the resulting digital data to the CPU 40.

The motor driver 46 is connected to the media transportation motor 26, carriage drive motor 56, magnetic head drive motor 57, and alignment motor 58, supplies drive current and drive pulses to the motors, and thus causes the motors to operate. Note also that an alignment motor 58 (FIG. 4) for operating the alignment plate 38 (FIG. 3) may also be connected to the motor driver 46.

The media edge sensors 47 are connected to the recording head 18 and magnetic head 34, and supply drive current to the recording head 18 to drive the recording wires to print. The media edge sensors 47 also output drive current for reading and writing to the magnetic head 34, and when reading magnetic data detect and output the detection voltage (analog voltage) from the magnetic head 34 as digital data to the CPU 40.

The CPU 40 acquires detection signals from the sensors and drives the motors to convey the recording medium S by the gate array 45, motor driver 46, and head driver 48 based on a control program stored in EEPROM 42, and drives the heads to record on the recording medium S.

The CPU 40 also conveys the recording medium S by the media transportation mechanism 100, and reads the surface of the recording medium S by the gate array 45 and first scanner 111 and second scanner 112. While scanning, the CPU 40 temporarily stores the data input from the gate array 45 sequentially to a buffer (not shown in the figure) rendered in RAM 41. The CPU 40 also reads and outputs the image data stored in the buffer (not shown in the figure) to the host computer 200 through the interface 43.

The commands sent from the host computer 200 to the dot impact printer 10 include setup commands, a start scanning (reading) command, and a paper discharge command.

The setup commands are commands for specifying the scanning resolution of the optical reader 110, the scanning side (whether to scan the top or bottom), the scanning direction, the scanning mode (color or monochrome scanning), the number of gray levels if monochrome scanning is selected, the LED output color if monochrome scanning is selected, and the scanning area (the start and end points of the scanning area) if only part of the scanning range R is to be scanned. Note that the coordinates of the start and end points of the scanning area are coordinates referenced to an origin at the left edge of the leading end of the scanning range R, for example. After receiving the setup command, the CPU 40 extracts the values specified in the setup command as the setting.

Figure 5:
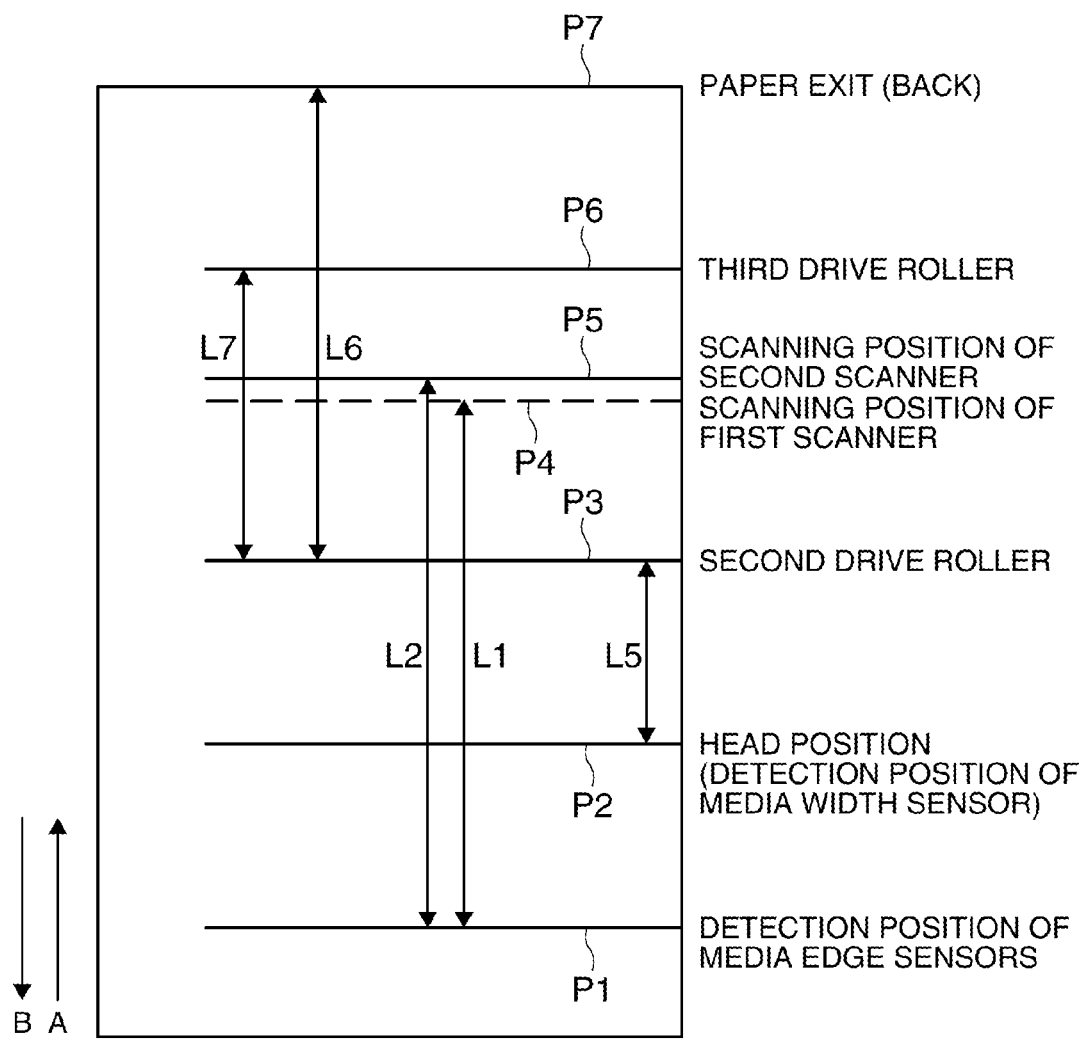
FIG. 5 schematically describes the relative positions of parts of the optical reading device.

FIG. 5 schematically describes the relative positions of parts of the dot impact printer 10 including the optical reader 110. The transportation direction of the media transportation mechanism 100 in FIG. 5 is the same as indicated by arrows A and B in FIG. 3. In addition, the bottom in the figure corresponds to the front of the print assembly 11, and the top of the figure corresponds to the back of the print assembly 11.

As described in FIG. 3 above, the media edge sensors 47, recording head 18, second drive roller 23A, first scanner 111, second scanner 112, third drive roller 124A, and paper exit 20 are disposed in sequence to the transportation path P of the recording medium S from the front in the conveyance direction. The media width sensor 55 mounted on the carriage 19 is disposed to the same position as the recording head 18 in the transportation direction of the recording medium S.

In FIG. 5 position P1 is the detection position of the media edge sensors 47, position P2 is the detection position of the media width sensor 55, position P3 is the nipping position of the second drive roller 23A, position P4 is the scanning position of the first scanner 111, position P5 is the scanning position of the second scanner 112, position P6 is the nipping position of the third drive roller 124A, and position P7 is the position of the paper exit 20. The distance from position P1 to position P4 us distance L1, and the distance from position P1 to position P5 is distance L2.

Devices according to the related art that convey and optically scan a recording medium S that is to be scanned usually need to know the size (total length) of the recording medium S in the transportation direction in order to determine where to stop scanning when scanning the entire surface of the recording medium S. As a result, when the size of the recording medium S in the transportation direction is unknown, the entire recording medium S is scanned once to optically detect the leading and trailing ends of the medium and measure the length, and this requires scanning to measure the document in addition to the normal scan to read the document.

However, when scanning the entire surface of a recording medium S for which the size or total length in the transportation direction is unknown, the dot impact printer 10 according to this embodiment of the invention can scan a document without measuring the total length of the document.

More specifically, when the leading end of the recording medium S inserted from the manual insertion opening 15 is detected by the media edge sensors 47, the CPU 40 of the dot impact printer 10 controls driving the media transportation mechanism 100 to convey the recording medium S. When the leading end of the recording medium S reaches position P2, the width or size in the subscan direction of the recording medium S is measured using the media width sensor 55, the recording medium S is then further advanced until the leading end of the recording medium S reaches position P4 and position P5, and scanning commences.

As described above, the media edge sensors 47 are a sensor that detects the presence of a recording medium S at a specific position near the manual insertion opening 15. If the media edge sensors 47 continue to detect the presence of the recording medium S when the leading end of the recording medium S reaches the scanning position of the first scanner 111, the recording medium S is located at least between the position P4 and position P1. More specifically, the trailing end of the recording medium S is at a position separated distance L1 from position P4, which is the scanning position of the first scanner 111, and the first scanner 111 scans at least length L1. In addition, if the media edge sensors 47 still detect the recording medium S when the leading end of the recording medium S reaches the scanning position of the second scanner 112, the recording medium S is present at least from position P5 to position P1. As a result, the bottom end (trailing end) of the recording medium S is at a position separated length L2 from position P5, the scanning position of the second scanner 112, and the second scanner 112 scans at least length L2.

In other words, when the first scanner 111 or second scanner 112 detects the leading end of the recording medium S, the length of the recording medium S is at least length L1 or length L2 if the trailing end of the recording medium S has not reached the detection position of the media edge sensors 47. The CPU 40 controls the operation of the dot impact printer 10 to scan this length of the recording medium S.

Note that the values of L1 to L7 in FIG. 5 are stored in EEPROM 42.

Figure 6:
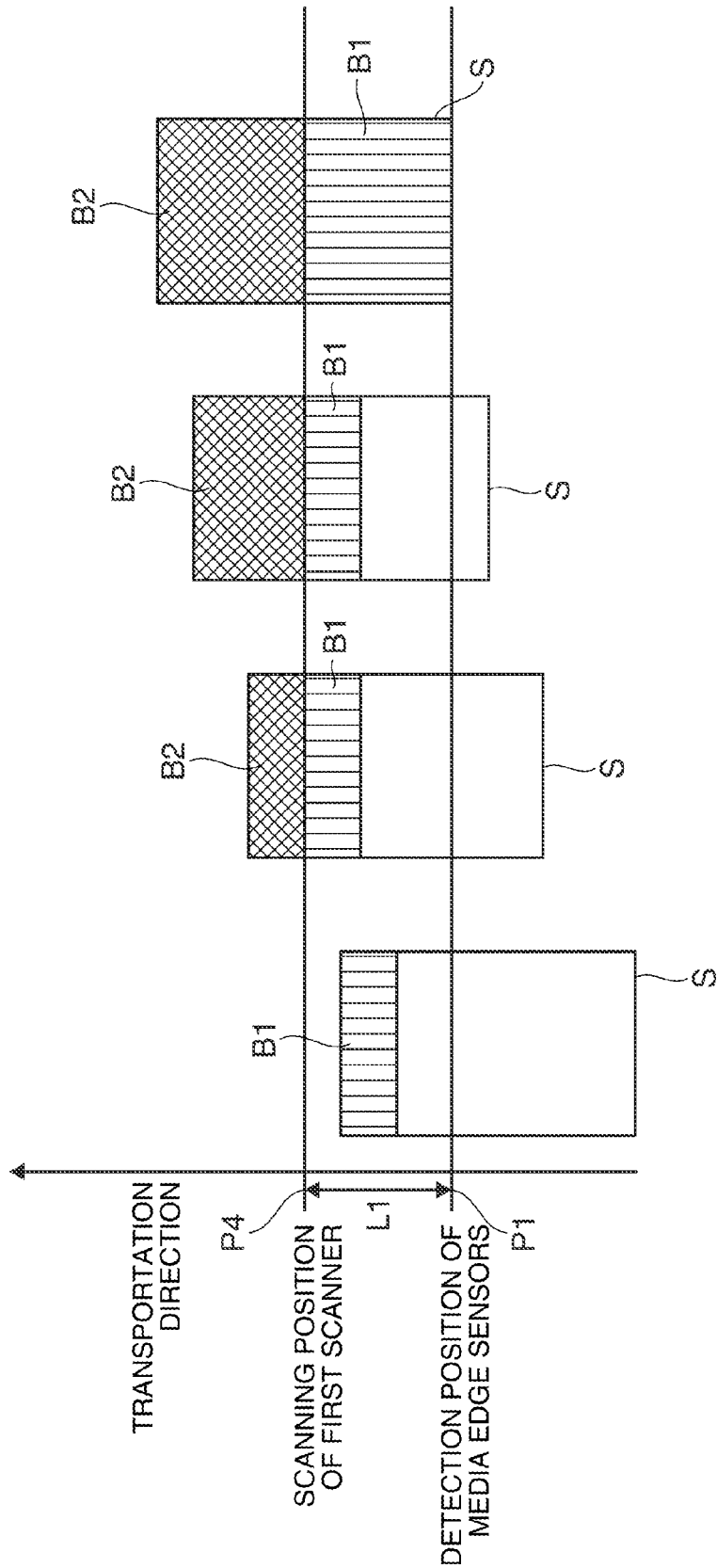
FIG. 6 describes the scanning operation of the optical reading device.

FIG. 6 describes an example of scanning by the optical reader 110. The change in the relative position of the recording medium S during the scanning operation is sequentially denoted (A) to (D).

FIG. 6 shows an example of scanning all of both sides of the recording medium S referenced to the scanning position P4 of the first scanner 111. Note that when the scanning operation shown in FIG. 6 starts, the total length of the recording medium S is unknown.

As shown in FIG. 6A, the CPU 40 conveys the medium to position P4 after the leading end of the recording medium S is detected by the media edge sensors 47, and sets the scanning block B1 as the scannable area based on the output of the media edge sensors 47 when or before the leading end of the recording medium S reaches position P4.

If the output of the media edge sensors 47 continuously indicates the presence of the recording medium S, the CPU 40 determines that the area of the recording medium S that can be scanned by the first scanner 111 is at least block B1, and initially sets block B1 as the range that can be scanned by the optical reader 110. The size of the scan block B1 (the length in the transportation direction) is less than or equal to length L1 from position P1 to position P4. If the size of the scan block B1 is set equal to length L1, the CPU 40 can set scan block B1 when the leading end of the recording medium S reaches position P4 while the detection state of the media edge sensors 47 continuously indicates that the recording medium S is present. If the size of the scan block B1 is set to less than length L1, the CPU 40 can set the scan block B1 before the recording medium S reaches position P4. In this example the size of the scan block B1 is initially set to less than the length L1 from position P1 to position P4.

The CPU 40 then conveys the recording medium S and starts scanning scan block B1 when position P4 is reached. If a duplex scan is required in this process, both the first scanner 111 and second scanner 112 of the optical reader 110 scan and the images captured therefrom are stored in RAM 41.

During the scanning operation the CPU 40 acquires the recording medium S detection state from the media edge sensors 47. As shown in FIG. 6B and FIG. 6C, before or after scanning scan block B1 ends, the CPU 40 sets a new scan block B1 based on whether or not the detection states of the media edge sensors 47 continuously indicate that the recording medium S is present. Because the previously set scan block B1 has already been scanned and is now scanned block B2, the CPU 40 starts scanning a new scan block B1. Note that the CPU 40 can set a new scan block B1 while scanning is in progress, and is not limited to setting a new scan block B1 when or after scanning a previously set scan block B1 is completed.

If the output of the media edge sensors 47 while scanning is in progress indicates that the recording medium S is not present, the CPU 40 detects this change as shown in FIG. 6D, and determines that the trailing end of the recording medium S reached position P1. The CPU 40 then extends the scan block B1 being scanned to the trailing end of the detected recording medium S, and sets block B1 equal to length L1. FIG. 6D shows when the scan block B1 reaches the trailing end of the recording medium S. Scanning therefore continues to the trailing end of the recording medium S.

If when or before the optical reader 110 starts scanning the media edge sensors 47 has already detected that the recording medium S is not present, the total length of the recording medium S is determined to be length L1 or less, and the entire surface of the recording medium S can be scanned in one scan block B1.

As described above, when the total length of the recording medium S in the transportation direction is unknown, the CPU 40 repeatedly executes the operation of setting the scan block B1 and scanning to the trailing end of the recording medium S, and can therefore scan the entire surface of the recording medium S without measuring the length of the medium.

The CPU 40 also manages length L5 from position P2, the position of the recording head 18, to the second drive roller 23A; length L6 from the second drive roller 23A to the paper exit 20; and length L7 from the second drive roller 23A to the third drive roller 124A. Whether the recording medium S can be held by the respective rollers and can be stably conveyed can be determined while the recording medium S is conveyed based on these lengths. In addition, the CPU 40 can continuously detect where the recording medium S is on the transportation path P based on how far the medium is conveyed by the optical reader 110 after the recording medium S is detected by the media edge sensors 47. This position is detected referenced to position P2, which is the position of the recording head 18, for example.

The scanning operation of the dot impact printer 10 is described next.

Figure 7:
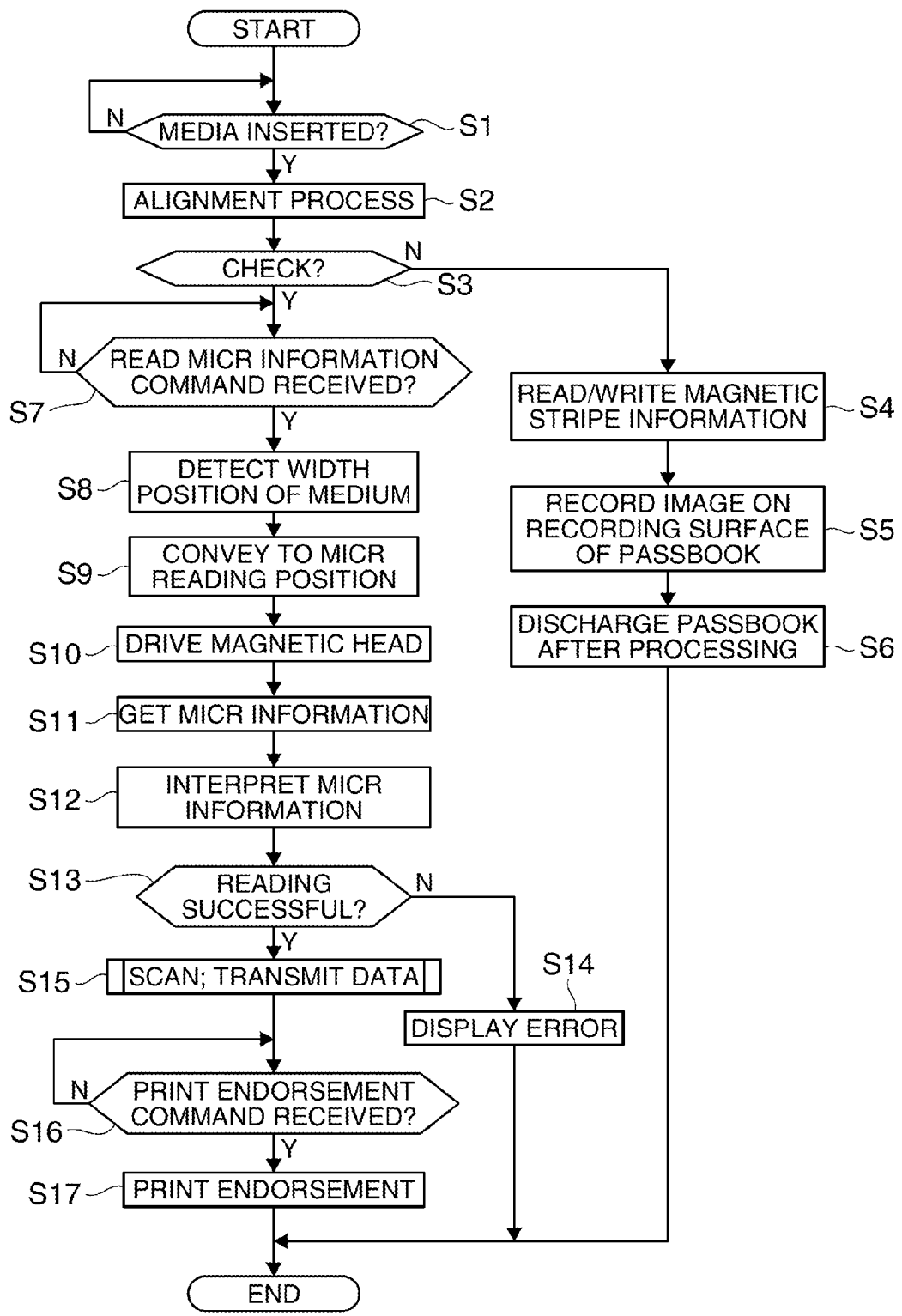
FIG. 7 is a flow chart of the operation of the dot impact printer.

FIG. 7 is a flow chart describing the operation of the dot impact printer 10 according to this embodiment of the invention.

When a recording medium S is inserted to the manual insertion opening 15 and the media edge sensors 47 detect the leading end of the recording medium S (step S1 returns Yes), the CPU 40 of the dot impact printer 10 drives the alignment plate 38 to protrude into the transportation path P of the recording medium S and operates the media transportation motor 26 to align the recording medium S (step S2).

The CPU 40 the determines whether the detected recording medium S is a check or a passbook (step S3).

The CPU 40 can determine the type of recording medium S based on information acquired from the host computer 200. Alternatively, the CPU 40 can detect the locations of the leading end and side of the recording medium S using the media edge sensors 47 and media width sensor 55, and determine the type of recording medium S based on this position and size information. Further alternatively, based on the positions of the leading end and side of the recording medium S detected using the media edge sensors 47 and media width sensor 55, the CPU 40 may attempt to read the MICR information using the magnetic head 34, and determine the type of recording medium S by determining whether or not MICR information is found in the MICR area MA by this reading attempt. In this embodiment of the invention the CPU 40 acquires from the host computer 200 information identifying the type of recording medium S (check or passbook), information such as the size of the check if the recording medium S is a check, information about the location of the MICR area MA, and information about the transportation distance, and determines based on the received information whether the recording medium S is a check or a passbook.

If the recording medium S is not a check (step S3 returns No) and the CPU 40 determines that the recording medium S is a passbook, for example, it conveys the recording medium S to the position where the magnetic stripe on the passbook can be read by the magnetic head 34, and then reads and/or writes the magnetic stripe by the magnetic head 34 (step S4).

The CPU 40 then conveys the recording medium S to the position of the recording head 18, records on the recording surface by the recording head 18 (step S5), and then discharges the recording medium S from the manual insertion opening 15 (step S6) to complete the process.

If the recording medium S is a check (step S3 returns Yes), the CPU 40 determines if a MICR information read command was received from the host computer 200 (step S7). If the CPU 40 determines that a MICR read command was received (step S7 returns Yes), it retracts the alignment plate 38 from the transportation path P, and conveys the recording medium S by the media transportation mechanism 100 until at least the leading end of the recording medium S is directly below the media width sensor 55. The CPU 40 then drives the carriage drive motor 56 (FIG. 5) to move the carriage 19 in the main scanning direction, and detects the widthwise position of the recording medium S based on the output signals from the media width sensor 55 and the position of the carriage 19 in the main scanning direction (step S8).

The CPU 40 then conveys the recording medium S by media transportation mechanism 100 to the position where the MICR area MA can be read by the magnetic head 34 (step S9), controls the motor driver 46 to operate the magnetic head drive motor 57 (FIG. 4), and reads the MICR text in the MICR area MA by the magnetic head 34 (step S10).

The MICR information read by the magnetic head 34 is then digitized by the gate array 45, the CPU 40 acquires the output digital data, extracts the character data from the digital data (step S11) and converts it to text information (step S12). Whether the number of uninterpretable characters in the extracted text exceeds a predetermined number, or whether the character count is within the range of the predetermined count and reading the MICR information was successful, is then determined (step S13).

If the number of characters exceeds the predetermined count and there is an unreadable character (step S13 returns No), the CPU 40 outputs an error and discharges the recording medium S (step S14), and ends operation. The error can be reported in step S15 using a display unit disposed to the dot impact printer 10, sending information indicating that an error occurred to the host computer 200, or using both methods.

If the number of uninterpretable characters does not exceed the preset count and reading was successful (step S13 returns Yes), the CPU 40 scans the recording medium S using the optical reader 110 and sends the captured image data to the host computer 200 (step S15), and then waits to receive a command to print an endorsement on the back from the host computer 200 (step S16). When an endorsement print command is received (step S16 returns Yes), the CPU 40 reverses the media transportation motor 26 to convey the recording medium S to below the recording head 18, and then drives the carriage drive motor 56 and recording head 18 to print an endorsement indicating that the check was processed on the back of the recording medium S (step S17). When printing the endorsement is completed, the CPU 40 drives the media transportation motor 26 again to discharge the recording medium S from the manual insertion opening 15 or the paper exit 20.

Figure 8:
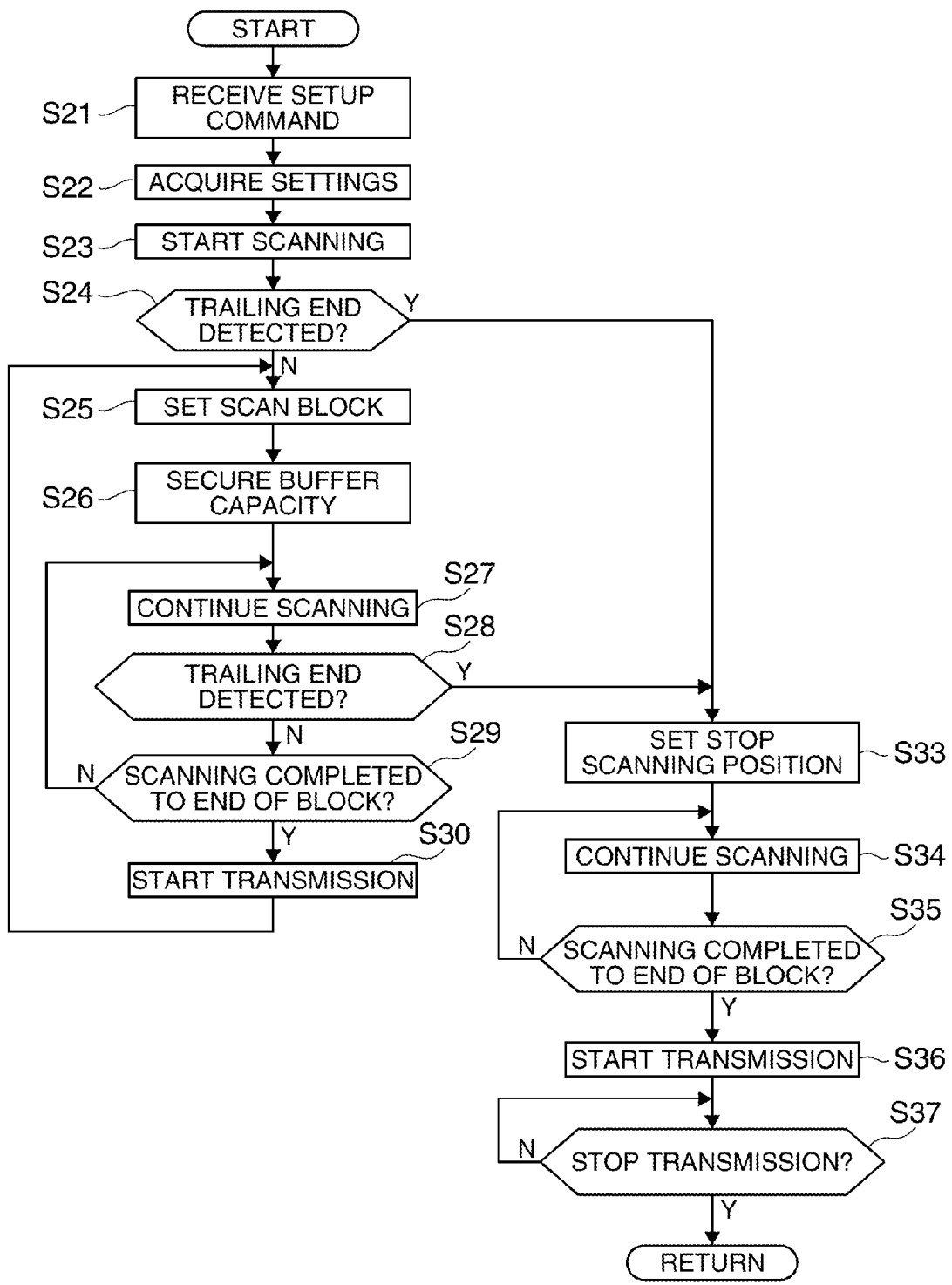
FIG. 8 is a flow chart of the operation of the dot impact printer.

FIG. 8 is a flow chart of the scanning operation executed by the dot impact printer 10, and describes the operation executed in step S16 in FIG. 7 in further detail.

The CPU 40 receives the setup command sent from the host computer 200 (step S21), and acquires the settings content specified by the setup command (step S22), and starts scanning (step S23).

When scanning starts, the CPU 40 conveys the leading end of the recording medium S to the detection position (position P4) of the first scanner 111, and monitors change in the detection state of the media edge sensors 47 while conveying the recording medium S (step S24). If the trailing end of the recording medium S is detected based on change in the detection state of the media edge sensors 47 (step S24 returns Yes), the CPU 40 goes to step S33.

If the trailing end of the recording medium S is not detected by the time the recording medium S is conveyed to position P4 (step S24 returns No), the CPU 40 sets a scan block with a length less than or equal to length L1 from position P4 to position P1 (step S25).

The CPU 40 then reserves space sufficient to store the scanned image data from the scan block in an image buffer rendered in RAM 41 (step S26). This capacity is determined from the length of the scan block, the width of the recording medium S, the scan resolution acquired in step S22, and the scanning mode, that is, color or monochrome. By assuring the capacity of the image buffer before scanning the scan block, the CPU 40 can scan the entire scan block without interruption.

After reserving sufficient image buffer capacity, the CPU 40 scans the scan block (step S27), continuously monitors the output status of the media edge sensors 47 while scanning, and determines if the trailing end of the recording medium S is detected by the media edge sensors 47 (step S28). The CPU 40 goes to step S33 if the trailing end of the recording medium S is detected (step S28 returns Yes).

If the trailing end of the recording medium S is not detected (step S28 returns No), the CPU 40 determines if scanning is completed to the trailing end of the scan block (step S29), and if scanning is not completed returns to step S27 and continues scanning. However, if scanning is completed to the trailing end of the scan block (step S29 returns Yes), the CPU 40 starts a process to send the scanned image of the scan block stored in the image buffer in RAM 41 to the host computer 200 (step S30).

The CPU 40 then returns to step S25, sets a new scan block to continue scanning (step S25), reserves space in the image buffer (step S26), and continues scanning (step S27).

If the trailing end of the recording medium S is detected based on change in the output of the media edge sensors 47 (step S24 returns Yes and step S28 returns Yes), the CPU 40 moves the end of the block being scanned to the detected trailing end of the recording medium S, and sets this reset end of the scan block as the position where scanning ends (step S33). More specifically, the scan block that is being scanned when the trailing end of the recording medium S is detected becomes the final scan block. The CPU 40 continues scanning the scan block (step S34), determines if scanning is completed to the trailing end of the scan block (step S35), and if scanning is not completed returns to step S34 and continues scanning. If scanning is completed to the trailing end of the scan block (step S35 returns Yes), the CPU 40 starts the process of sending the scanned image of the scan block stored in the image buffer in RAM 41 to the host computer 200 (step S36). When sending the scanned image is completed (step S37 returns Yes), the scanning operation ends.

As described above the photosensors of the first scanner 111 and second scanner 112 are offset with the first scanner 111 positioned approximately 5 mm in front in this embodiment of the invention. As a result, scanning the scanning range R on the top side is completed before the scanning range R on the bottom is completed when scanning in the forward direction, and when scanning in reverse scanning the scanning range R on the bottom is completed before scanning the scanning range R on the top is completed.

The CPU 40 separately controls the scanning operation of the first scanner 111 and the scanning operation of the second scanner 112, but when setting the scan blocks sets the scan blocks to the same size when scanning the top of the recording medium S by the first scanner 111 and when scanning the bottom of the recording medium S by the second scanner 112. As a result, if scanning by the first scanner 111 and scanning by the second scanner 112 start simultaneously, scanning the top and bottom sides end simultaneously, and both sides can be scanned at the same time with no shift therebetween.

The size of the scan blocks may also be set referenced to the distance from the first scanner 111 or second scanner 112 that is farther from the media edge sensors 47 to the detection position of the media edge sensors 47. This eliminates the possibility of scanning ending in the middle of scanning one side.

A dot impact printer 10 according to this embodiment of the invention has an optical reader 110 that optically reads the surface of a recording medium S; an image buffer in RAM 41 that stores the scanned image output by the optical reader 110; media edge sensors 47 that detect a recording medium S at a position on the recording medium S transportation path separated from the scanning position of the optical reader 110; and a CPU 40 that controls the media transportation mechanism 100 and optical reader 110, and reads and outputs scanned images stored in the image buffer to a host computer 200. When scanning the entire surface of the recording medium S by the optical reader 110, the CPU 40 sets the smallest scannable range as the scan block and scans the set scan block before or when the optical reader 110 starts scanning based on the detection state of the media edge sensors 47 and the distances L1 and L2 from the scanning position of the optical reader 110 to the detection position of the media edge sensors 47.

As a result, when the size of the recording medium S to be scanned is unknown or when scanning all of the recording medium S, a scan block that is the smallest scannable range is set before the scanning operation of the optical reader 110 starts (before conveying the recording medium S by the media transportation mechanism 100) or when scanning starts (when conveyance starts), based on the distance from the scanning position of the optical reader 110 to the detection position of the media edge sensors 47, and detection of an edge of the recording medium S by the media edge sensors 47, and the set scan block is scanned. As a result, scanning can proceed quickly without needing to first convey the recording medium S to measure its size.

For example, when a recording medium S is detected in the distance from the detection position of the media edge sensors 47 to the scanning position of the optical reader 110, a scanning block equal to the distance from the detection position of the media edge sensors 47 to the scanning position of the optical reader 110 can be set as the smallest possible scanning range. If the recording medium S is detected in a distance shorter than from the detection position of the media edge sensors 47 to the scanning position of the optical reader 110, a scan block equal to the distance in which the recording medium S was detected may be set that can be scanned.

When scanning at least the scan block ends, sending the scanned image stored in the image buffer to the host computer 200 starts without waiting to complete scanning all of the recording medium S. That is, because the CPU 40 starts sending the image data for blocks for which scanning has been completed while scanning another block continues, the delay time imposed by interrupting scanning only to transmit the scanned image can be shortened. As a result, the total time required to scan all of the recording medium S can be shortened, throughput can be improved, and convenience can be improved. In addition, because the scanned image data stored in the image buffer is sent sequentially, the storage capacity of the image buffer can be less than when the scanned image data for the entire recording medium S is sent at once. In addition, when scanning plural blocks is completed, the scanned image data may be sent in a single batch to the host computer 200.

In addition, because the dot impact printer 10 defines and scans a new scan block after scanning a previously set scan block is completed, the next scan block can be set appropriately even when the size of the recording medium S being scanned is unknown, and the entire surface of the recording medium S can be scanned continuously. As a result, all of a recording medium S can be scanned quickly without executing a separate operation to measure the size of the recording medium S. For example, when the recording medium S is detected in the distance from the detection position of the media edge sensors 47 to the scanning position of the optical reader 110, a scan block is set from the detection position of the media edge sensors 47 to the scanning position of the optical reader 110. If a recording medium S that is shorter than the distance from the detection position of the media edge sensors 47 to the scanning position of the optical reader 110 is detected, the scan block is set with a length equal to the distance in which the recording medium S was detected.

Furthermore, because the dot impact printer 10 secures an image buffer with the smallest storage capacity needed according to the size of the scan block after the scan block is set, scanning can continue smoothly without interrupting the scanning process due to insufficient image buffer capacity, for example. In this case there is no need to wait for storage capacity to be cleared by sending the scanned image data to the host computer 200.

The optical reader 110 has a first scanner 111 that scans one side of a recording medium S and a second scanner 112 that scans the other side of the recording medium S, and can scan both sides of the medium by the first scanner 111 and second scanner 112. The CPU 40 sets scan blocks of a common size for the first scanner 111 and second scanner 112 based on the detection position of the media edge sensors 47, and the distances L1 and L2 from the scanning position P4 of the first scanner 111 or the scanning position P5 of the second scanner 112 to the detection position of the media edge sensors 47. As a result, the first scanner 111 and second scanner 112 can scan at the same time, scanning both sides can proceed simultaneously even when the size of the recording medium S is unknown, and the processing time can be further reduced.

In addition, when the end of the recording medium S is detected while scanning a scan block, the CPU 40 extends the end of the block being scanned to the detected end of the recording medium S. As a result, scanning can continue without interruption to the trailing end of the recording medium S without performing a separate operation to measure the size of the recording medium S. Yet further, because image data in the range to the end of the recording medium S that is shorter than distance from the detection position of the media edge sensors 47 to the scanning position of the optical reader 110 is sent together with the block being scanned to the host computer 200, throughput can be further improved.

A preferred embodiment of the invention is described above, but the invention is not limited thereto. For example, a configuration in which the alignment mechanism 28, recording head 18, and optical reader 110 are disposed in this order to the transportation path P of the recording medium S is described in the foregoing embodiment, but the invention is not so limited and the locations of these devices can be changed as desired. For example, the optical reader 110 could be disposed closest to the manual insertion opening 15.

In addition, the foregoing embodiment describes a control unit that is disposed to a control circuit board (not shown in the figure) installed in the dot impact printer 10, has the functions shown in the function blocks in FIG. 4, and controls other parts of the dot impact printer 10, but a device externally connected to the dot impact printer 10 could function as the function units shown in FIG. 4 and control operation of the dot impact printer 10. In addition, the function blocks shown in FIG. 4 are rendered by cooperation of hardware and software components, but the specific configuration of the hardware component and the specifications of the software component are not limited, and the detailed configurations thereof can be changed as desired.

Furthermore, the first scanner 111 and second scanner 112 in the foregoing embodiment are described as using RGB light sources to enable monochrome or color scanning, but a configuration using an infrared light source to enable infrared scanning is also conceivable. Furthermore, because magnetic ink has higher infrared absorbance than normal ink, infrared light can be used to read only the characters printed in magnetic ink, thereby enabling optically reading the MICR text in the MICR area MA efficiently.

The foregoing embodiment describes scanning all of the recording medium S while conveying the recording medium S in the normal (forward) direction (indicated by arrow A in FIG. 5) in FIG. 5 and FIG. 6, but the invention is not so limited and the invention can also be used to scan the entire medium while conveying the recording medium S in reverse.

The foregoing embodiment describes the invention applied to a flatbed scanner that conveys the recording medium S horizontally, but the invention is not so limited and can obviously be applied to a device with a transportation path that conveys recording media S such as checks and slips standing vertically on edge.

The foregoing embodiment also describes a dot impact printer 10 having an optical reader 110, but the invention is not so limited and can obviously be applied to other configurations having an optical reading unit comparable to the optical reader 110 disposed to an inkjet printer, thermal printer, or laser printer, for example. Yet further, the invention is not limited to devices that are used as a stand-alone printer, and configurations having an optical reading unit comparable to the optical reader 110 disposed in another device (such as an ATM (automated teller machine) or CD (cash dispenser)) are also conceivable.

Yet further, the invention is not limited to configurations rendering an optical reader 110 in unison with a device that records text or images on paper or other recording medium, and can obviously be applied to a wide range of other devices including stand-alone scanners and photocopiers.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An optical reading device comprising:
a transportation unit that conveys a medium to be scanned;
an optical reading unit that is disposed to the transportation path of the medium and optically reads the medium;
a medium detection unit that detects the medium on the transportation path;
a control unit that controls the transportation unit and the optical reading unit; and
a storage unit that stores the distance from the scanning position of the optical reading unit to the detection position of the medium detection unit;
wherein before or when the scanning operation of the optical reading unit starts the control unit sets a scannable range that can be scanned based on the distance from the scanning position of the optical reading unit to the detection position of the medium detection unit stored in the storage unit and detection of the conveyed medium by the medium detection unit, and scans this scannable range.

2. The optical reading device described in claim 1, wherein:
the length in the transportation direction of the medium in the scannable range set by the control unit is equal to or shorter than the distance from the scanning position of the optical reading unit to the detection position of the medium detection unit.

3. The optical reading device described in claim 1, wherein:
the optical reading device can be connected to an external device, and
has a temporary storage unit that stores a scanned image captured by the optical reading unit; and
the control unit sends the scanned image of the scannable range stored in the temporary storage unit at least when scanning the scannable range ends.

4. The optical reading device described in claim 1, wherein:
the control unit sets the next scannable range while scanning or after completing scanning the scannable range based on the distance from the scanning position of the optical reading unit to the detection position of the medium detection unit and the result of detecting the conveyed medium by the medium detection unit.

5. The optical reading device described in claim 1, wherein:
the optical reading unit has a temporary storage unit that stores a scanned image captured by the optical reading unit; and
after setting the scannable range, the control unit secures storage capacity in the temporary storage unit according to the size of the scannable range.

6. The optical reading device described in claim 1, wherein:
the optical reading unit has a first scanning unit that scans one side of the medium, and a second scanning unit that scans the other side of the medium; and
the control unit sets the scannable range to a size common to the first scanning unit and the second scanning unit based on the medium detection status of the medium detection unit, and the distance from the scanning position of the first scanning unit or second scanning unit to the detection position of the medium detection unit.

7. The optical reading device described in claim 1, wherein:
when the medium detection unit detects the end of the medium while the scannable range is being scanned, the control unit sets the end of the scannable range being scanned to the detected end of the medium.

8. A method of controlling an optical reading device that has a control unit, a transportation unit that conveys a medium to be scanned, an optical reading unit that is disposed to the transportation path of the medium and optically reads the medium, a medium detection unit that detects the medium on the transportation path, and a storage unit that stores the distance from the scanning position of the optical reading unit to the detection position of the medium detection unit, the control method comprising steps of:
setting, before or when the scanning operation of the optical reading unit starts, a scannable range that can be scanned based on the distance from the scanning position of the optical reading unit to the detection position of the medium detection unit stored in the storage unit and detection of the conveyed medium by the medium detection unit; and
scanning this scannable range.

9. The optical reading device control method described in claim 8, wherein:
the length in the transportation direction of the medium in the scannable range is set by the control unit, equal to or shorter than the distance from the scanning position of the optical reading unit to the detection position of the medium detection unit.

10. The optical reading device control method described in claim 8, wherein:
the optical reading device can be connected to an external device, and
has a temporary storage unit that stores a scanned image captured by the optical reading unit; and
the control unit sends the scanned image of the scannable range stored in the temporary storage unit at least when scanning the scannable range ends.

11. The optical reading device control method described in claim 8, wherein:
the control unit sets the next scannable range while scanning or after completing scanning the scannable range based on the distance from the scanning position of the optical reading unit to the detection position of the medium detection unit and the result of detecting the conveyed medium by the medium detection unit.

12. The optical reading device control method described in claim 8, wherein:
the optical reading unit has a temporary storage unit that stores a scanned image captured by the optical reading unit; and
after setting the scannable range, the control unit secures storage capacity in the temporary storage unit according to the size of the scannable range.

13. The optical reading device control method described in claim 8, wherein:
the optical reading unit has a first scanning unit that scans one side of the medium, and a second scanning unit that scans the other side of the medium; and
the control unit sets the scannable range to a size common to the first scanning unit and the second scanning unit based on the medium detection status of the medium detection unit, and the distance from the scanning position of the first scanning unit or second scanning unit to the detection position of the medium detection unit.

14. The optical reading device control method described in claim 8, wherein:
when the medium detection unit detects the end of the medium while the scannable range is being scanned, the control unit sets the end of the scannable range being scanned to the detected end of the medium.

15. A non-transitory recording medium storing a program that can be executed in an optical reading device having a control unit by the control unit, wherein:
the optical reading device has a transportation unit that conveys a medium to be scanned, an optical reading unit that is disposed to the transportation path of the medium and optically reads the medium, a medium detection unit that detects the medium on the transportation path at a position on the transportation path separated from the scanning position of the optical reading unit, and a storage unit that stores the distance from the scanning position of the optical reading unit to the detection position of the medium detection unit,
the program comprising as steps executed by the control unit steps of:
setting, before or when the scanning operation of the optical reading unit starts, a scannable range that can be scanned based on the distance from the scanning position of the optical reading unit to the detection position of the medium detection unit stored in the storage unit and detection of the conveyed medium by the medium detection unit; and scanning this scannable range.

* * * * *